United States Patent
Kolar et al.

(10) Patent No.: US 11,507,887 B2
(45) Date of Patent: Nov. 22, 2022

(54) MODEL INTERPRETABILITY USING PROXY FEATURES

(71) Applicant: Cisco Technology, Inc., San Jose, CA (US)

(72) Inventors: Vinay Kumar Kolar, San Jose, CA (US); Jean-Philippe Vasseur, Saint Martin d'uriage (FR); Pierre-André Savalle, Rueil-Malmaison (FR); Grégory Mermoud, Veyras (CH)

(73) Assignee: Cisco Technology, Inc., San Jose, CA (US)

( * ) Notice: Subject to any disclaimer, the term of this patent is extended or adjusted under 35 U.S.C. 154(b) by 414 days.

(21) Appl. No.: 16/832,090

(22) Filed: Mar. 27, 2020

(65) Prior Publication Data

US 2021/0304061 A1    Sep. 30, 2021

(51) Int. Cl.
| | | |
|---|---|---|
| *G06F 11/00* | (2006.01) | |
| *G06N 20/00* | (2019.01) | |
| *G06N 5/04* | (2006.01) | |
| *G06N 20/20* | (2019.01) | |
| *G06F 11/07* | (2006.01) | |

(52) U.S. Cl.
CPC .......... *G06N 20/00* (2019.01); *G06N 5/04* (2013.01); *G06N 20/20* (2019.01); *G06F 11/0751* (2013.01)

(58) Field of Classification Search
CPC ................................ G06N 20/20; G06N 20/00
See application file for complete search history.

(56) References Cited

U.S. PATENT DOCUMENTS

| | | | |
|---|---|---|---|
| 10,311,368 B2 | 6/2019 | Lokare et al. | |
| 2018/0018590 A1 | 1/2018 | Szeto et al. | |
| 2018/0189128 A1* | 7/2018 | Qiao ................... | G06F 11/0727 |
| 2019/0147369 A1 | 5/2019 | Gupta et al. | |
| 2019/0253328 A1 | 8/2019 | Kolar et al. | |
| 2019/0325333 A1 | 10/2019 | Chan et al. | |
| 2021/0027205 A1* | 1/2021 | Sevakula ............. | G06N 3/0445 |
| 2021/0165708 A1* | 6/2021 | Vijayaraghavan ........................... G06F 11/0703 |

(Continued)

OTHER PUBLICATIONS

Molnar, Christoph, "Interpretable Machine Learning: A Guide for Making Black Box Models Explainable", online: https://originalstatic.aminer.cn/misc/pdf/Molnar-interpretable-machine-learning_compressed.pdf, Feb. 2019, 251 pages.

(Continued)

*Primary Examiner* — Jonathan D Gibson
(74) *Attorney, Agent, or Firm* — Behmke Innovation Group LLC; Kenneth J. Heywood; Jonathon P. Western

(57) ABSTRACT

In one embodiment, a service identifies a set of attributes associated with a first machine learning model trained to make an inference about a computer network. The service obtains labels for each of the set of attributes, each label indicating whether its corresponding attribute is a probable cause of the inference. The service maps input features of the first machine learning model to those attributes in the set of attributes that were labeled as probable causes of the inference. The service generates a second machine learning model in part by using the mapped attributes to form a set of input features for the second machine learning model, whereby the input features of the first machine learning model and the input features of the second machine learning model differ.

20 Claims, 9 Drawing Sheets

(56) References Cited

U.S. PATENT DOCUMENTS

2021/0174253 A1*  6/2021  Moore .................. G06N 20/00
2021/0303378 A1*  9/2021  Sethi ..................... G06N 20/20
2022/0091923 A1*  3/2022  O'Toole ............. G06F 11/0772

OTHER PUBLICATIONS

Murdoch, et al., "Interpretable Machine Learning: Definitions, Methods, and Applications", online: https://arxiv.org/pdf/1901.04592.pdf, Jan. 2019, 11 pages.
Robnik-Sikonja, Marko, "Improving Random Forests", Machine Learning, ECML 2004, LNAI 3201, pp. 359-370, Springer, Berlin, Heidelberg.
Rudin, Cynthia, "Stop Explaining Black Box Machine Learning Models for High Stakes Decisions and Use Interpretable Models Instead", online: https://arxiv.org/pdf/1811.10154.pdf, Sep. 2019, 20 pages.

* cited by examiner

… (1)

MODEL INTERPRETABILITY USING PROXY FEATURES

TECHNICAL FIELD

The present disclosure relates generally to computer networks, and, more particularly, to model interpretability using proxy features.

BACKGROUND

Networks are large-scale distributed systems governed by complex dynamics and very large number of parameters. In general, network assurance involves applying analytics to captured network information, to assess the health of the network. For example, a network assurance service may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

With the recent proliferation of machine learning techniques, new opportunities have arisen with respect to monitoring a network. Indeed, machine learning has proven quite capable of analyzing complex network patterns and identifying problems that might otherwise be missed by a network administrator. In some cases, a machine learning-based network assurance system may even be able to predict problems before they occur, allowing for corrective measures to be taken in advance.

Unfortunately, decisions made by a machine learning model with respect to a monitored network often lack explainability. As a result, without knowing why the model detected an anomaly or predicted a failure in a network, a network administrator may have difficulty determining the appropriate corrective action. This lack of explainability can also lead administrators and other users to distrust the monitoring system.

DESCRIPTION OF EXAMPLE EMBODIMENTS

Overview

Figure 1A:
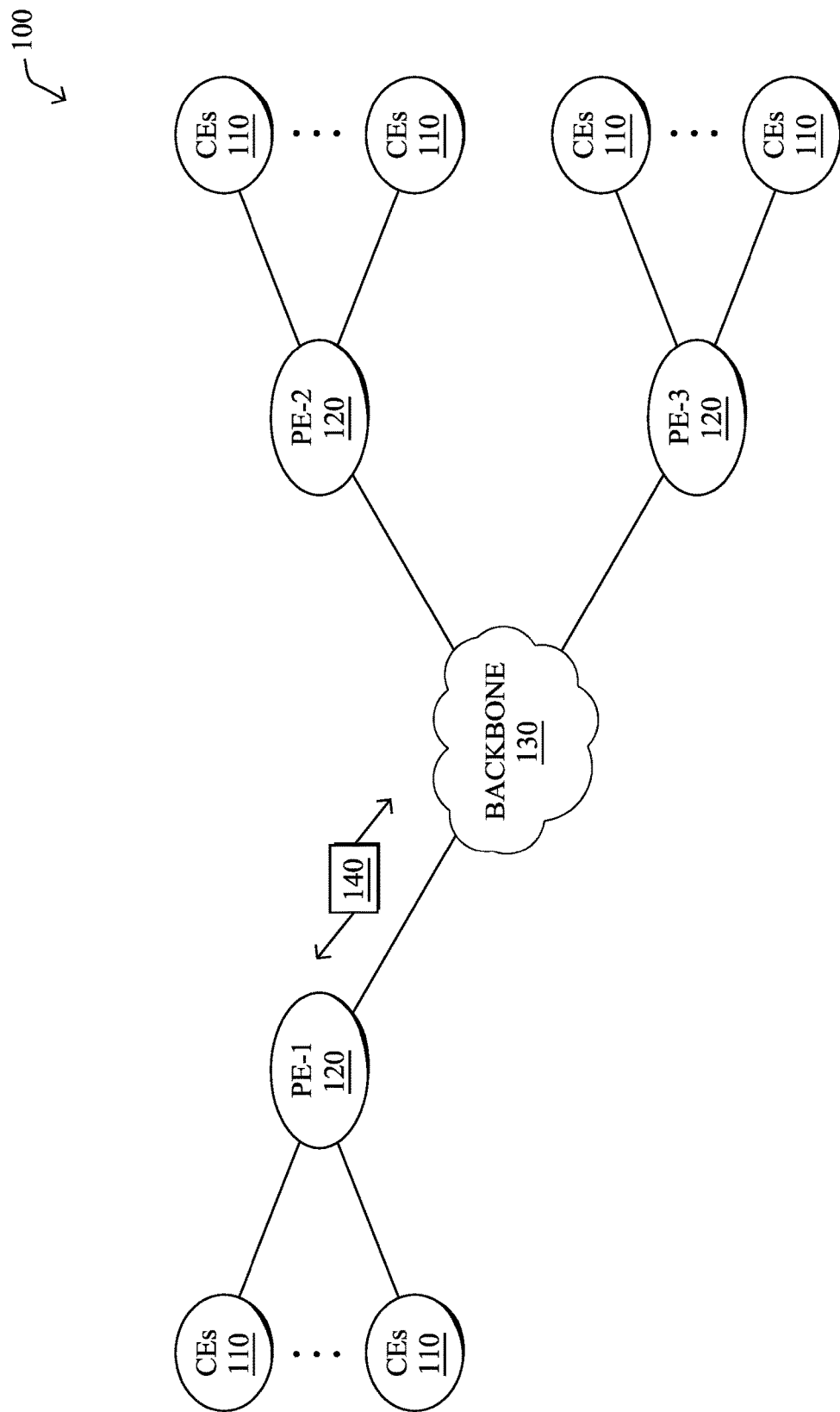
FIGS. 1A-1B illustrate an example communication network.

According to one or more embodiments of the disclosure, a service identifies a set of attributes associated with a first machine learning model trained to make an inference about a computer network. The service obtains labels for each of the set of attributes, each label indicating whether its corresponding attribute is a probable cause of the inference. The service maps input features of the first machine learning model to those attributes in the set of attributes that were labeled as probable causes of the inference. The service generates a second machine learning model in part by using the mapped attributes to form a set of input features for the second machine learning model, whereby the input features of the first machine learning model and the input features of the second machine learning model differ.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection. 2.) Site Type B: a site connected to the network using two MPLS VPN links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B 1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
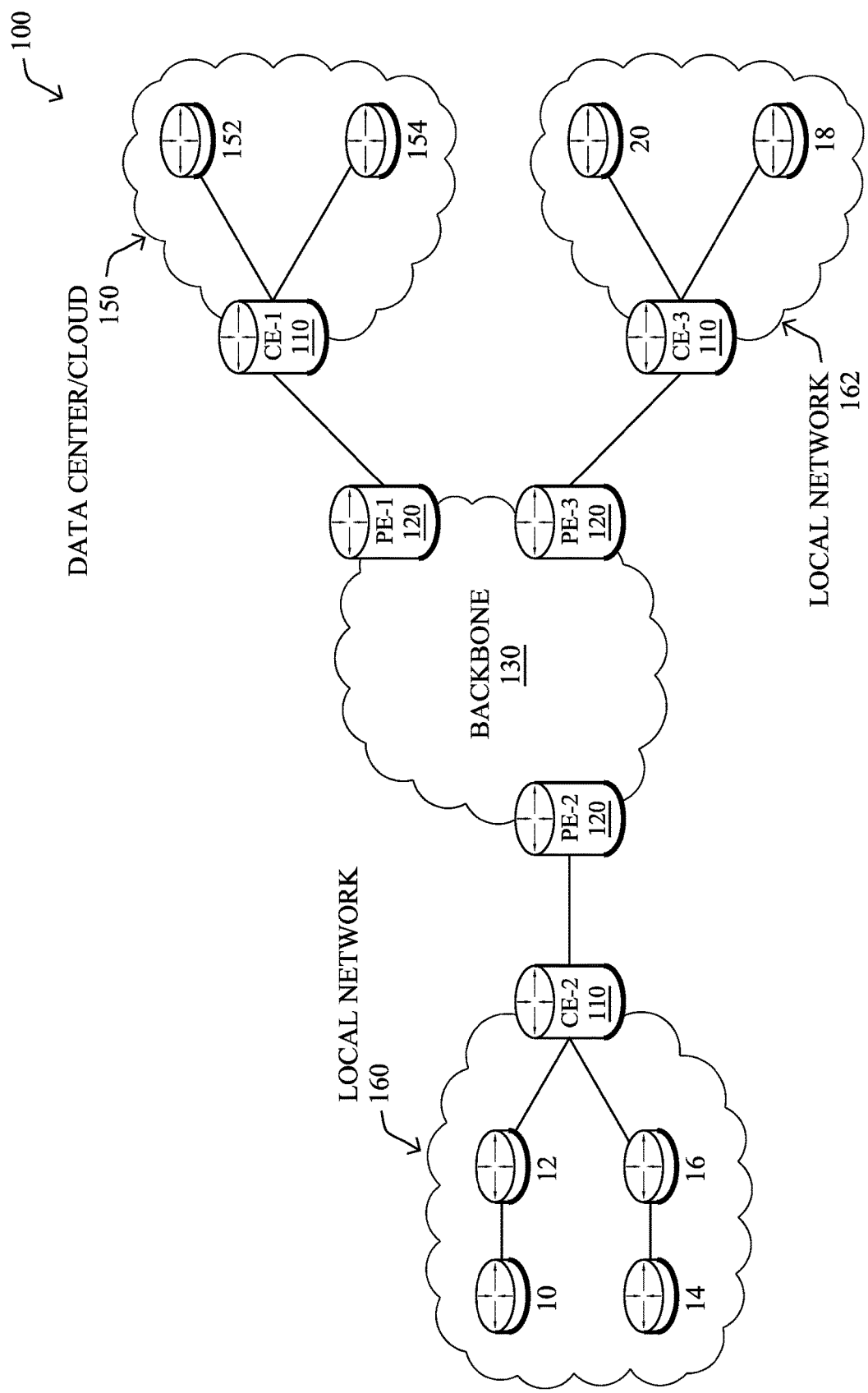

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
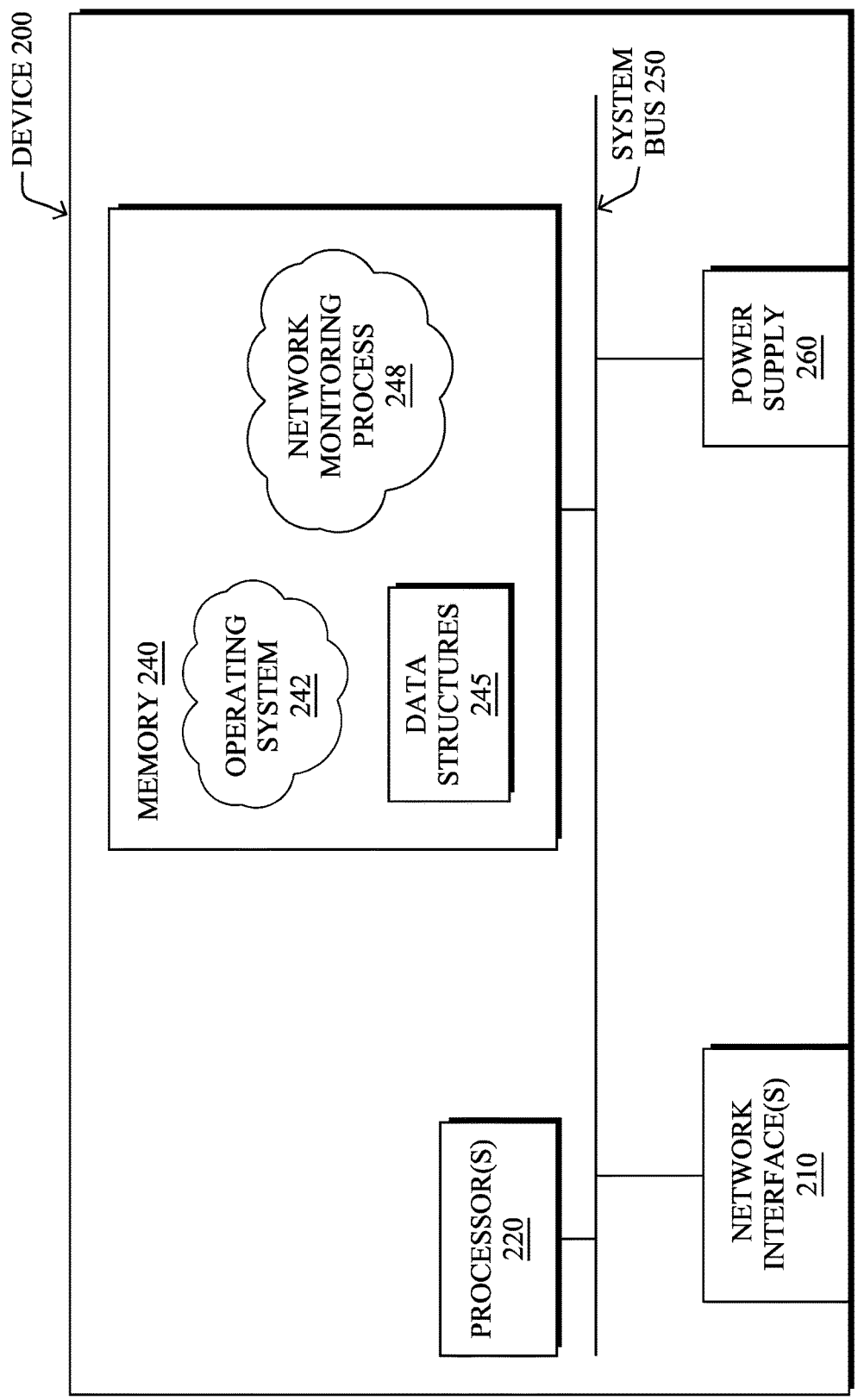
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network monitoring process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network monitoring process 248 includes computer executable instructions that, when executed by processor(s) 220, cause device 200 to perform network monitoring as part of a network monitoring infrastructure for one or more networks. In some embodiments, network monitoring process 248 may utilize machine learning techniques, to detect network anomalies and/or forecast key performance indicators (KPIs)/failures for one or more monitored networks. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network monitoring process 248 may employ one or more supervised, unsupervised, or semi-supervised machine learning models. Generally, supervised learning entails the use of a training set of data, as noted above, that is used to train the model to apply labels to the input data. For example, the training data may include samples of 'good' operations and 'bad' operations and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior, as in the case of unsupervised anomaly detection. Semi-supervised learning models take a middle ground approach that uses a greatly reduced set of labeled training data.

Example machine learning techniques that Forecasting process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) ANNs (e.g., for non-linear models), replicating reservoir networks (e.g., for non-linear models, typically for time series), random forest classification, deep learning models, or the like.

The performance of a machine learning model can be evaluated in a number of ways based on the number of true positives, false positives, true negatives, and/or false negatives of the model. For example, consider the case of a machine learning model that predicts whether a network tunnel is likely to fail. In such ca case, the false positives of the model may refer to the number of times the model incorrectly predicted that the tunnel would fail. Conversely, the false negatives of the model may refer to the number of times the model incorrectly predicted that the tunnel would not fail. True negatives and positives may refer to the number of times the model correctly predicted whether the tunnel would operate as expected or is likely to fail, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
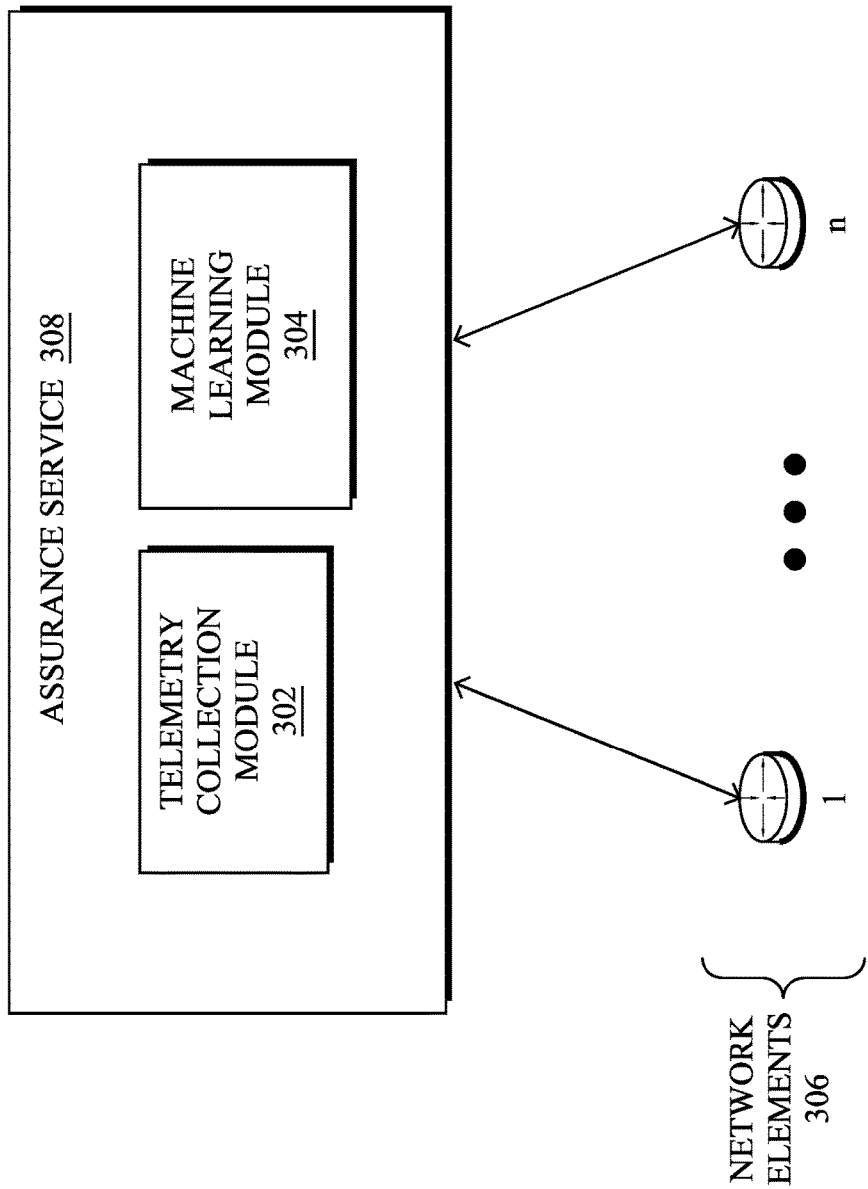
FIG. 3 illustrates an example architecture for performing network assurance in a network.

FIG. 3 illustrates an example architecture 300 for performing network assurance in a network, according to various embodiments. At the core of architecture 300 is an assurance service 308 that is responsible for overseeing the operations of network elements 306. As shown, assurance service 308 may include the following components: a telemetry collection module 302 and a machine learning module 304. These components 302-304 may be implemented in a distributed manner or implemented as their own stand-alone services, either as part of the network under observation or as a remote service. In addition, the functionalities of the components of architecture 300 may be combined, omitted, or implemented as part of other processes, as desired.

Assurance service 308 may be in communication with any number of network elements 306 (e.g., a first through $n^{th}$ device), such as CE routers 110, described previously, or any other form of networking device found in a network (e.g., access points, switches, routers, etc.). In general, the goal of assurance service 308 is to ensure that the network(s) associated with networking elements 306 continue to function properly and forecast any failures before they occur. For example, in one embodiment, network elements 306 may be part of the same software defined WAN (SD-WAN) and the forecasting may entail predicting when SD-WAN tunnels will fail. In another embodiment, network elements 306 may be located in one or more wireless networks and the goal of assurance service 308 is then to predict onboarding failures, roaming failures, and the like. As would be appreciated, architecture 300 is flexible and be applied to any number of different network types and predictions.

By way of example, there are typically many circumstances in a network that can lead to tunnel failures in various areas of the network between a head-end and tail-end router (e.g., between routers 110, etc.). An objective of machine learning module 304, as detailed below, is to learn early signs (networking behavioral) that have some predictive power, allowing the model to predict/forecast a failure. It is expected that some failures are predictable (i.e., there exist early signs of an upcoming failure) while others will not be non-predictable (e.g., fiber cut, router crash, etc.). More specifically, almost all failures exhibit early signs, but those signs may appear only a few milliseconds (or even nanoseconds), prior to the failure (e.g. fiber cut), thereby making forecasting an almost impossible task. Some non-predictable failures may be due to the absence of signaling back to the network element 306 involved and may be localized to the core of the service provider network (e.g., the underlying IP, 4G, 5G, etc. network), in which case the failure is non-predicable from the perspective of the network element 306.

A first aspect of architecture 300 relates to telemetry collection module 302 obtaining the telemetry data required for model training by machine learning module 304. As used herein, the term 'relevant telemetry' refers to a telemetry measurement variable with predictive power to predict failures in a network, which can be determined dynamically by machine learning module 304. Indeed, failures may be predictable, yet not successfully predicted, due to a lack of relevant telemetry, the inability of the model to predict the failure, or the telemetry is sampled at too coarse of a time granularity. In some embodiments, to obtain relevant telemetry from network elements 306, service 308 may send a custom request to one or more of network elements 306 with the objective of obtaining the list of events of interest along with the set of candidate telemetry variables with potential predictive power to predict failures. In further embodiments, network elements 306 may instead provide the telemetry data to service 308 on a push basis (e.g., without service 308 first requesting the telemetry data).

In various embodiments, telemetry collection module 302 may adjust the set of telemetry variables/parameters obtained from the network element(s) 306 and/or their sampling frequency. If, for example, machine learning module 304 determines that a particular telemetry variable has a strong predictive power (according to the feature importance, Shapley values, etc.), the frequency at which such a variable may be gathered may be higher compared to a variable with lower predictive power. Machine learning module 304 may also determine the predictive power of a particular telemetry variable by assessing the conditional probabilities involved, in further embodiments.

Machine learning module 304 may also select the set of most relevant telemetry variables. In turn, telemetry collection module 302 may request that network elements 306 measure and send these variables to service 308 periodically, since real-time variations of such telemetry is needed for forecasting tunnel down events or other network failures. For example, based on the above conclusion, machine learning module 304 may determine that the CPU and memory utilizations of one or more networking devices that support a given tunnel should be sent periodically (e.g., every 1 second) by network elements 306.

Telemetry collection module 302 may also request other telemetry variables from device(s) 306 in response to the occurrence of certain events, such as during a rekey failure when the edge router is not able to successfully exchange the security keys with the controller. Since such events are rare and the states of the variables remain the same for longer periods of time, telemetry collection module 302 may request an event-based push request, rather than periodic messages. In other words, telemetry collection module 302 may instruct one or more of network elements 306 to report certain telemetry variables only after occurrence of certain events. For example, Table 1 below shows some example telemetry variables and when a network element 306 may report them to service 308, as in the case of predicting tunnel failures:

TABLE 1

| Relevant Telemetry | Request Type |
| --- | --- |
| Memory_utilization | Requested from head and |
| CPU Utilization | tail edge routers. |
| BFD Probe Latency, | Periodically once every |
| Loss and Jitter | 1 second. |
| Queue statistics (%-age drops for different queues) | |
| Interface down event | Requested from both head |
| Rekey exchange failure | and tail edge routers |
| Router crash logs | Upon event occurrence. |

In a further embodiment, machine learning module 304 may also attempt to optimize the load imposed on the network element(s) 306 reporting the telemetry variables to service 308. For example, machine learning module 304 may determine that the CPU and memory usages should be measured and reported every minute to service 308.

A key functionality of machine learning module 304 is to train any number of machine learning-based models to predict failures by forecasting network KPIs and/or detect anomalous conditions in the network (e.g., by comparing an observed network behavior to a baseline/expected behavior). Preferably, the models are time-series models trained centrally (e.g., in the cloud) using the telemetry collected by telemetry collection module 302. In one instantiation of machine learning module 304, the models may be trained on a per customer or per-network basis. Testing has shown that model performance may be influenced by parameters specific to a given network instantiation, thus promoting an implementation whereby machine learning module 304 trains a model for a specific network deployment. In further embodiments, machine learning module 304 may even train certain models on a per-tunnel or other network entity basis. Although such an approach may be of limited scalability, it may be highly valuable for tunnels carrying a very large amount of potentially very sensitive traffic (e.g., inter-cloud/data center traffic).

As pointed out earlier, with current reactive routing approaches, recall (i.e., the proportion of failures being successfully predicted) is simply equal to 0, since rerouting is always reactive. In other words, the system reacts a posteriori. As a result, any recall >0 is a significant gain. One performance metric that machine learning module 304 may consider is the maximum recall (Max_Recall) achieved by the model given a precision>P_Min. For example, machine learning module 304 may evaluate the variability of Max_Recall across datasets, should a single model be trained across all datasets, to determine whether a network-specific or even a tunnel or other entity-specific model should be trained.

In various embodiments, machine learning module 304 may dynamically switch between per-tunnel, per-customer/network, and global (e.g., multiple networks) approaches to model training. For example, machine learning module 304 may start with the least granular approach (e.g., a global model across all customers/networks) and then evaluate the performance of the global model versus that of per-customer/network models. Such model performance comparison could be easily evaluated by comparing their related precision-recall curves (PRCs)/area under the curve (AUCs), or the relative Max_Recall, given that Precision>P_min.

In some cases, machine learning module 304 may employ a policy to trigger per-customer/network specific model training, if the Max_Recall value improvement is greater than a given threshold. In another embodiment, a similar policy approach may be used to specifically require a dedicated model for a given tunnel or other network entity according to its characteristic (between router A and router B), the type of traffic being carried out (e.g., sensitive traffic of type T, etc.), or the performance of the global or specific model for that entity. In such a case, the network elements 306 may be in charge of observing the routed traffic and, on detecting a traffic type matching the policy, request specific model training by machine learning module 304, to start per-tunnel model training for that tunnel.

Prototyping of the techniques herein using simple models and input features based on coarse KPI telemetry, such as 1-minute averages of loss, latency, jitter, traffic, as well as CPU/memory of CE routers, lead to recalls in the range of a few percent with a precision of 80% or more. More advanced time-series models, such as long short-term memories (LSTMs), especially with attention mechanisms, will achieve even better performance. More importantly, using richer and more fine-grained telemetry is an important driver of the forecasting performance.

Once machine learning module 304 has trained a prediction model, different options exist for its inference location (e.g., where the model is executed to predict tunnel failures). In a first embodiment, model inference is performed centrally (in the cloud), thus co-located with the model training. In such a case, once machine learning module 304 identifies the set of telemetry variables with predictive power (used for prediction), telemetry collection module 302 may send a custom message to the corresponding network element(s) 306 listing the set of variables along with their sampling/reporting frequencies. Note that sampling is a dynamic parameter used by machine learning module 304 computed so as to optimize the PRC of the model against the additional overhead of the network element 306 pushing additional data to the cloud (and also generating additional logging of data on the router).

In another embodiment, machine learning module 304 may push the inference task, and the corresponding prediction model, to a specific network element 306, so that the prediction is preformed on-premise. Such an approach may be triggered by the frequency of sampling required to achieve the required model performance. For example, some failure types are known to provide signal a few seconds, or even milliseconds, before the failure. In such cases, performing the inference in the cloud is not a viable option, making on-premise execution of the model the better approach. Inference/model execution is usually not an expensive task on premise, especially when compared to model training. That being said, it may require fast processing on local event with an impact on the local CPU. In yet another embodiment, some models may be executed on premise, if the local resources on the router/network element 306 are sufficient to feed the local model.

Thus, in some cases, the techniques herein support centralized model training (e.g., in the cloud), combined with the ability to perform local (on-premise) inference based on the required sampling frequency, local resources available on the network element 306, as well as the bandwidth required to send the telemetry for input to a model in the cloud. For example, one failure prediction model may require a slow sampling rate but a large amount of data, due to a high number of input features with predictive power. Thus, reporting these telemetry variables to the cloud for prediction may consume too much WAN bandwidth on the network. In such a case, machine learning module 304 may take this constraint into account by evaluating the volume of required telemetry, according to the sampling frequency, and the WAN bandwidth allocated on the network for the telemetry traffic. To that end, machine learning module 304 may analyze the topology of the network and the available bandwidth for telemetry reporting (e.g., according to the QoS policy). If the bandwidth available for the telemetry used for the inference of the model exceeds the capacity, machine learning module 304 may decide to activate a local inference by pushing a prediction model to one or more of network elements 306.

In yet another embodiment, machine learning module 304 may take a mixed approach whereby some of network elements 306 perform the inferences locally, while others rely on assurance service 308 to perform the predictions.

A further embodiment of the techniques herein introduces a feedback mechanism whereby feedback regarding the predictions by a trained model is provided to assurance service 308. In cases in which the model is executed on a network element 306, the network element 306 may report the rate of false positives and/or false negatives to assurance service 308. Optionally, the reporting can also include additional context information about each false positive and/or false negative, such as the values of the telemetry variables that led to the incorrect prediction. If the performance of the model is below a designated threshold, assurance service 308 may trigger machine learning module 304 to retrain the model, potentially increasing the granularity of the model, as well (e.g., by training a tunnel-specific model, etc.). In cases in which machine learning module 304 trains multiple prediction models, service 308 may evaluate the performance of each model and, based on their performances, decide that a particular one of the models should be used. Such an approach allows machine learning module 304 to dynamically switch between models, based on the data pattern currently being observed.

When failures are predicted in the cloud by assurance service 308, service 308 may similarly receive feedback from network elements 306 regarding the predictions. For example, once a model M predicts the failure of a tunnel at a given time, machine learning module 304 may send a notification to the affected network element 306 indicating the (list of) tunnel(s) for which a failure is predicted, along with the predicted time for the failure, and other parameters such as the failure probability Pf (which can be a simple flag, a categorical variable (low, medium, high) or a real number). The network element 306 may use Pf to determine the appropriate action, such as pro-actively rerouting the traffic that would be affected by the failure onto a backup tunnel. In one embodiment, the predicted failure may be signaled to the network element 306 using a unicast message for one or more tunnels, or a multicast messages signaling a list of predicted failure to a set of network elements 306.

Regardless of how service 308 receives its feedback, either from the network element 306 executing the prediction model or from machine learning module 304 executing the model, service 308 may dynamically trigger machine learning module 304 to retrain a given model. In one embodiment, the model re-training may be systematic. In another embodiment, upon reaching a plateau in terms of improvement for Max_Recall or Max_Precision, service 308 may reduce the frequency of the model training.

As would be appreciated, while architecture 300 is described above primarily with respect to predicting tunnel failures in an SD-WAN, architecture 300 can be used for any number of different network assurance purposes. For example, KPIs in a wireless network can equally be used to forecast failures using architecture 300. In such a case, network elements 306 may instead take the form of wireless access points (APs), wireless LAN controllers (WLCs), switches, routers, or the like, and the KPIs may include values such as received signal strength indicator (RSSI) values, DHCP metrics, AP client counts, and the like. Such information can then be used to forecast failures such as onboarding issues, roaming failures, etc.

Figure 4A:
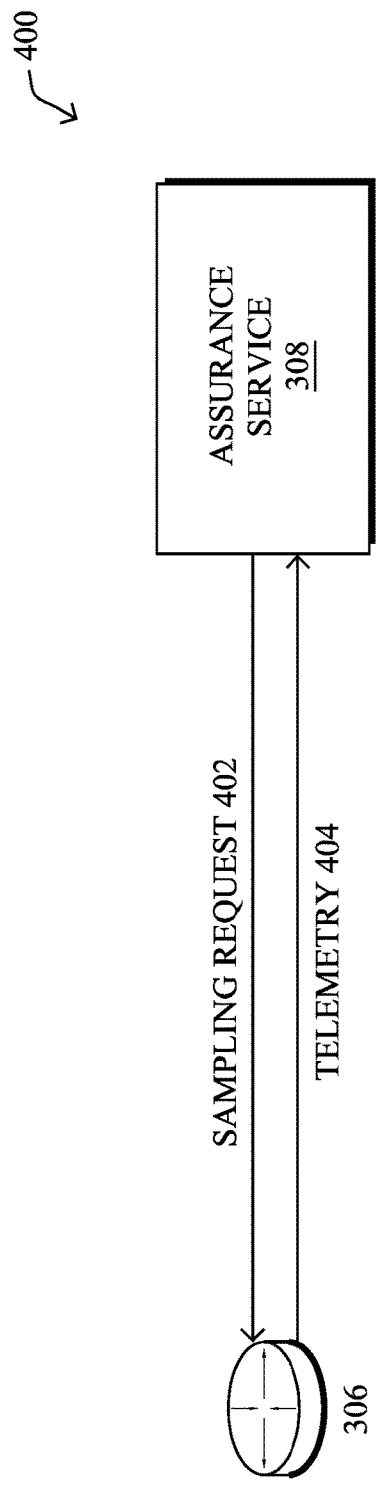
FIGS. 4A-4C illustrate examples of the interactions of a network element and a network assurance service.
Figure 4B:
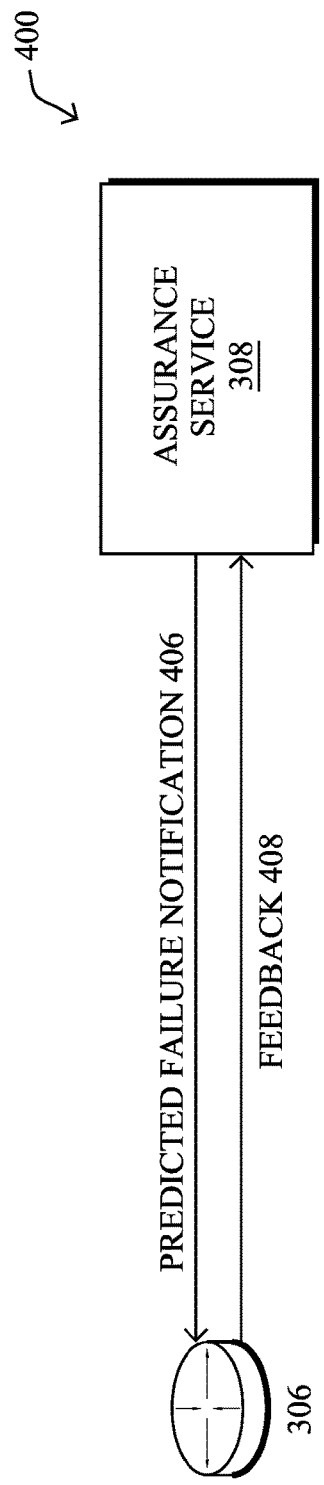
Figure 4C:
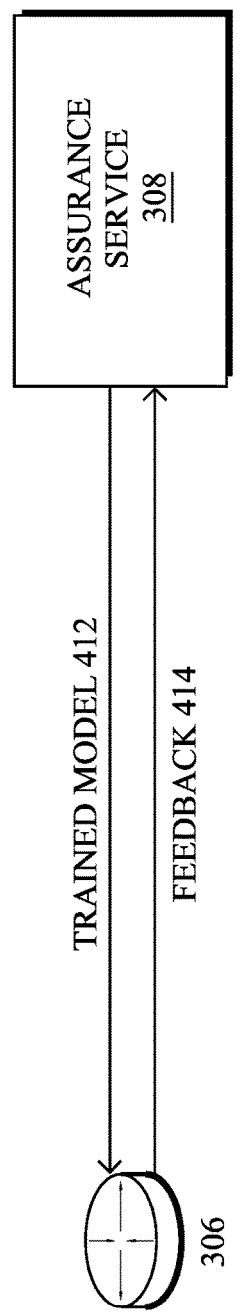

FIGS. 4A-4C illustrate examples of feedback for tunnel failure predictions, in various embodiments. As shown in example implementation 400 in FIGS. 4A-4B, assume that the trained model is executed in the cloud by assurance service 308. In such a case, service 308 may send a sampling request 402 to a network element 306 that indicates the telemetry variables to sample and report, as well as the determined sampling/reporting period(s) for those variables. In turn, network element 306 may report the requested telemetry 404 to service 308 for analysis. For example, service 308 may request that network element 306 report is CPU load every minute to service 308, to predict whether the tunnel associated with network element 306 is predicted to fail. More specifically, service 308 may use telemetry 404 as input to its trained prediction model, to determine whether telemetry 404 is indicative of a failure that will occur in the future.

When assurance service 308 determines that a failure is predicted, it may send a predicted failure notification 406 to network element 306 that identifies the tunnel or other network entity predicted to fail (e.g., a link, a device, etc.), the time at which the failure is expected to occur, and potentially the probability of failure, as well. Depending on the timing and probability of failure, network element 306 may opt to reroute the affected traffic, or a portion thereof, or take other corrective measures. In turn, network element 306 may monitor the entity predicted to fail and provide feedback 408 to service 308 indicating whether the tunnel actually failed and, if so, when. Service 308 can then use feedback 408 to determine whether model retraining should be initiated, such as by training a more granular model.

FIG. 4C illustrates an alternate implementation 410 in which assurance service 308 pushes the failure prediction model to network element 306 for local/on-premise inference. For example, service 308 may opt for network element 306 to perform the local inferences, such as when model 412 requires too much bandwidth to send the needed telemetry to service 308 for cloud-based prediction. In turn, network element 306 may use the corresponding telemetry measurements as input to trained model 412 and, if a failure is predicted, perform a corrective measure such as proactively rerouting the traffic to one or more other tunnels. In addition, network element 306 may provide feedback 414 to service 308 that indicates false positives and/or false negatives by the model. For example, if network element 306 reroutes traffic away from a tunnel predicted by model 412 to fail, and the tunnel does not actually fail, network element 306 may inform service 308. Service 308 may use feedback 414 to determine whether model 412 requires retraining, such as by adjusting which telemetry variables are used as input to the model, adjusting the granularity of the training (e.g., by using only training telemetry data from the tunnel, etc.), or the like.

As noted above, explaining why a machine learning model made a certain decision can be just as important as the accuracy of the model itself. For example, a network administrator may want to know why a given model has marked some network events as anomalous, why the model is predicting that an SD-WAN tunnel will fail within the next minute, or the like. In other cases, the lack of interpretability of the model can leave the administrator guessing as to what corrective actions should be taken for a particular decision of the model. In addition, a lack of interpretability can lead administrators and other users to distrust the network monitoring system. Indeed, it has been found that some models in production may use input features for predicting/forecasting that are not intuitive to the users. Further, in closed-loop implementation whereby the model's output automatically drives actions in the network, the prediction of a particular outcome may lead to different actions or mitigations, depending on the input features to the model (i.e., to pinpoint the cause of the event so that it can be addressed).

One approach to addressing the issue of model interpretability is to attribute the prediction of a model to one or more of its input features. For example, in a model trained to predict SD-WAN tunnel failures, one of the input features with the highest importance score is the "mean jitter over the last 7 days." Oftentimes, though, this information does not provide good explanations to domain experts. While this provides some information to the (e.g., that long-term jitter is important to the model), it also fails to provide any good explanation as to why long-term jitter may lead to a prediction that a failure is going to occur in the next 1 minute. This leads the expert to conjecture as to what this might mean: is high jitter because of long distance links, or due to highly variable queue lengths, or due to certain service-provider networks, or other reasons? However, if that feature is removed and only meaningful features (e.g., distance between source and destination, queue length, or service-provider) are provided to the model, the model accuracy may drop significantly, making the model unusable.

In summary, such approaches often do not provide a good explanation to most end users without sacrificing model accuracy, and the interpretations most often raise more questions to end users (which they have to solve it manually by reasoning with their experience). In the previous examples, one could wonder whether the model was simply incorrect, since predicting a failure within the next minute using average jitter does not make sense to the user, or was this a proxy features of other variables, in which case knowing those variables may be crucial to model interpretability.

Model Interpretability Using Proxy Features

The techniques herein introduce systems and methods for providing model interpretability to end users without compromising the accuracy of the model. In some aspects, the techniques herein can automatically identify "proxy features" from existing features that are meaningful to end users, and can be used to dynamically adapt the system. While appropriate, it also automates interpretable model based on the analysis of proxy features and its relationship with the model. In further aspects, the techniques allow for the system to generate an equivalent interpretable/explainable model that can aid in interpretability by using a mix of automatic inferences and guided by user feedback. In another aspect, the techniques herein allow the system to dynamically switch from a non-interpretable model to an interpretable one. In yet another aspect, the techniques herein introduce an interpretable model inference engine that enables providing interpretation for each row of data that is presented to the model.

Specifically, according to one or more embodiments of the disclosure as described in detail below, a service identifies a set of attributes associated with a first machine learning model trained to make an inference about a computer network. The service obtains labels for each of the set of attributes, each label indicating whether its corresponding attribute is a probable cause of the inference. The service maps input features of the first machine learning model to those attributes in the set of attributes that were labeled as probable causes of the inference. The service generates a second machine learning model in part by using the mapped attributes to form a set of input features for the second machine learning model, whereby the input features of the first machine learning model and the input features of the second machine learning model differ.

Illustratively, the techniques described herein may be performed by hardware, software, and/or firmware, such as in accordance with the network monitoring process 248, or another process, which may include computer executable instructions executed by the processor 220 (or independent processor of interfaces 210) to perform functions relating to the techniques described herein.

Figure 5A:
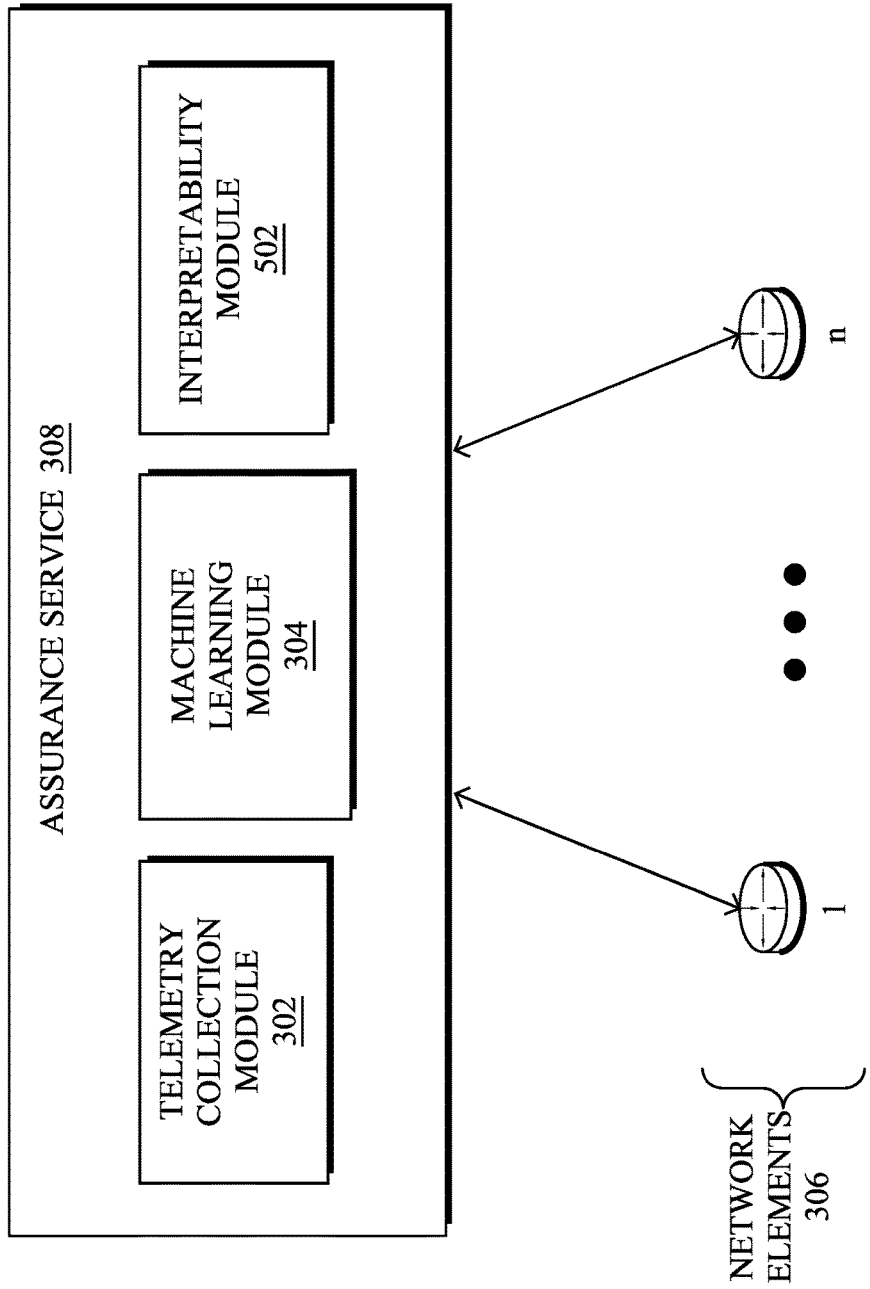
FIGS. 5A-5B illustrate an example architecture for model interpretability using proxy features.
Figure 5B:
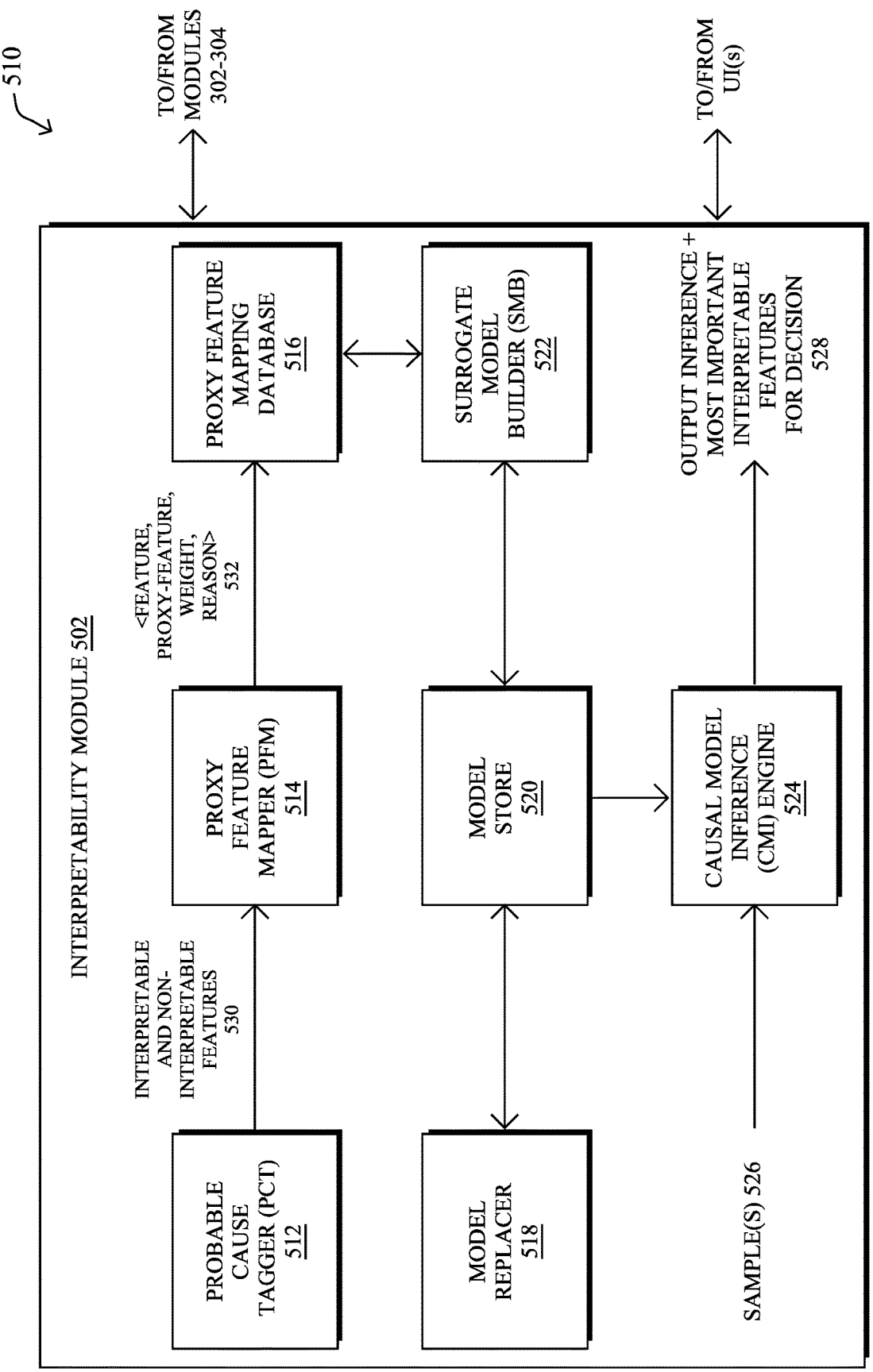

Operationally, FIGS. 5A-5B illustrate an example architecture 500 for model interpretability using proxy features, according to various embodiments. As shown in FIG. 5A and continuing the example of FIGS. 3 and 4A-4C, a key component of architecture 500 is interpretability module 502 that may be implemented as part of assurance service 308 or executed directly on any of the network elements 306 in conjunction with any machine learning models deployed to those elements by assurance service 308.

During execution, interpretability module 502 may operate in conjunction with telemetry collection module 302 and/or machine learning module 304 to provide interpretability to a user for any of the machine learning models generated by machine learning module 304 and used to monitor and assess any number of different networks. As would be appreciated, while interpretability module 502 is shown and described as a separate module from those of modules 302-304, its functionality can be incorporated directly into these modules, as desired.

FIG. 5B illustrates an example architecture 510 for interpretability module 502, according to various embodiments. As shown, interpretability module 502 may comprise any or all of the following subcomponents: a probable cause tagger (PCT) 512, a proxy feature mapper (PFM) 514, a proxy feature mapping database 516, a model replacer 518, a model store 520, a surrogate model builder (SMB) 522, and/or a causal model inference (CMI) engine 524. These subcomponents 512-524 may be implemented in a distributed manner or implemented as their own stand-alone services, either as part of the network under observation or as a remote service. In addition, the functionalities of the subcomponents of architecture 510 may be combined, omitted, or implemented as part of other processes, as desired.

During execution, probable cause tagger (PCT) 512 is responsible for marking the attributes and features associated with a model used to monitor a network as a probable cause for a decision of the model of interest to the end user (e.g., an SD-WAN tunnel failure predicted by a model of machine learning module 304, etc.). As used herein, the term 'causal attribute' refers to an attribute that the end user considers as a probable cause for explaining the decision of the model and may or may not be an actual input of the model.

In a simple embodiment, PCT 512 may provide to a user interface (UI) all of the attributes computed by assurance service 302 during its Extract-Transform-Load (ETL) or equivalent data pre-processing and used by machine learning module 304 to train the model under scrutiny. In turn, the user may operate the UI to mark the attribute variables as either probable causes for the model or not and PCT 512 may store this information in a configuration file or other suitable location.

For purposes of illustrating the techniques herein, the following terminology is used:

1. Attribute is used to indicate any piece of data computed by ETL pipelines, which may or may not be used as a model input feature.

2. Probable causes are marked as such by the end user via the UI, based on their expert knowledge of the underlying system. Note that an attribute may or may not be a probable cause only with respect to a given use case (e.g., a particular output/decision of a model, etc.).

3. Feature is used to indicate only the data that is actually used as input to the machine learning model under scrutiny.

As a result of this processing, PCT 512 will have a list of features 530 of the machine learning model that have been labeled by the expert user as either 'interpretable' or 'non-interpretable.'

Another component of architecture 510 may be proxy feature mapper (PFM) 514, which is responsible for mapping a feature to all probable cause attributes that it might be proxying, as guided by the user via the UI. Note that PFM 514 can be hosted at a variety of different locations in the network, such as on an on-prem server, in the cloud as part of assurance service 302, or even on a network element 306, such as an edge device.

In one embodiment, PFM 514 may calculate a Pearson's correlation coefficient between each of the various attributes associated with the model. In turn, based on these correlation coefficients, PFM 514 may select the attributes that are most highly correlated. Then, PFM 514 may map each feature $F_i$ to the other highly correlated attributes, e.g., based on a comparison between the absolute value of the correlation coefficient to a predefined threshold. Thus, PFM 514 may create a proxy-mapping-set $S(F_i)$ for each feature $F_i$ that may include a set of tuples $<A_j,s_j>$., where $A_j$ is an probable cause attribute, and $s_j$ is the score of, say, absolute of the correlation which indicates how strongly the attribute $A_j$ is correlated with feature $A_i$. If any attribute is categorical, PFM 514 may also perform some form of transformation (e.g., one-hot encoding), to construct a continuous attribute before the mapping.

In various embodiments, PFM 514 may use another correlation measure to evaluate the correlation between the attributes associated with the model, in addition to, or in lieu of, Pearson's correlation coefficient. For example, PFM 514 could also use Spearman's rank correlation coefficient, Kendall rank correlation coefficient, or the like. In further embodiments, PFM 514 may employ the use of different forms of correlation coefficients.

In various embodiments, PFM 514 may map categorical features using heuristics. In one embodiment, PFM 514 may compute the correlations between the continuous attributes associated with the model. In the case of categorical attributes, PFM 514 may instead map a categorical attribute $A_i$ to another categorical or continuous attribute $A_j$. Here, the goal is to determine whether certain values of $A_j$ can be mapped with high confidence to some value of $A_i$. If so, then PFM 514 can use $A_j$ to replace $A_i$. In one embodiment, PFM 514 can take the following approach to create a mapping between a categorical value $A_i$ and its mapping set $S(A_i)$:

1. For each categorical attribute $A_i$, consider other attributes $A_j$.
2. Employ a simple, multi-class classifier to predict $A_i$ from $A_j$. The classifier may input just one input $A_j$ (if $A_j$ is also categorical, then a one-hot encoding $A_j$ can be considered features) and predict the output class representing the possible values for $A_i$.
3. The model is trained from the dataset, and some accuracy metric (say, AUC or Precision) is measured. A high score indicates that there is some function that can map $A_i$ to $A_j$.
4. The mapping set $S(A_i)$ is built by adding all attributes $A_j$ which have high accuracy, such as a high area under the curve (AUC) value. The score for $A_j$ can be derived from the AUC value, and may be normalized between 0 and 1 or matched to the correlation scores between $A_i$ for other continuous variables.

Optionally, the mapping set of each feature $A_i$ ($S(A_i)$) by PFM 514 may be presented to the end user via the UI. In turn, the user may also be able to add, delete, or alter scores based on the domain knowledge and via the UI.

PFM 514 may store the sets of features and their understandable equivalents in proxy feature mapping database 516. For example, in one embodiment, as shown, each entry 532 in proxy feature mapping database 516 may be of the form <feature, proxy-feature, weight, reason>. Note that the weight can be based on the ones computed as above (e.g., using the scores computed for the mappings). Later, when the user interacts with interpretability module 502, this score will be suitably changed based on user preferences to map feature $A_i$ to an equivalent, understandable feature $A_j$.

According to various embodiments, architecture 510 may also include a surrogate model builder (SMB) 522, which is responsible for explaining the model, as guided by the expert(s) via the UI(s). More specifically, SMB 522 may will interact with the end user(s) via the UI(s) to create a surrogate model that can be used for interpretability. In other words, SMB 522 may generate a surrogate machine learning model that can be used to help a user interpret a machine learning model actually used to monitor and evaluate the network.

In one embodiment, SMB 522 may create a new surrogate model with a different input feature set than its corresponding model. To do so, SMB 522 may replace all of the features in the original model that are not probable causes (e.g., as marked by user through operation of PCT 512) with the set of probable causes that are proxied by them. In other words, SMB 522 may replace any feature $F_i$ that is not a probable cause with features in $S(F_i)$.

As a result, a surrogate model M' is created instead of the original model M, by SMB 522 training with the causal feature list instead of the original feature list. Thus, the surrogate model M' uses a different set of input features than that of model M, which is restricted to the set of probable causes, as defined by the end user via the UI.

As would be appreciated, the performance of model M' is generally lower than that of model M. If the accuracy of model M' is comparable to that of the original model M, then model M' could actually be used as a replacement for M altogether. Note that model M' is the new surrogate model created only for interpretability purposes using the above approaches. However, if the accuracy of model M' is much worse than model M, then the latter shall be used in production (e.g., to actually evaluate the network), whereas M' only serves as a surrogate to provide interpretability for the outputs/decisions of model M.

Regardless of the actual performance of the surrogate model, SMB 522 may also determine the feature importance $p_i$ for each feature $F_i$. To do so, SMB 522 may employ any or all of the following approaches:

In one approach, if the model M' is capable of providing feature importance metric (such as XGBoost or RandomForest model), SMB 522 maps each feature $F_i$ with its primary feature importance $p_i$.

In another approach, SMB 522 can use techniques like Mean Decrease in Accuracy (MDA) to measure the $p_i$. In this scenario, each feature $F_i$ is removed and the model is retrained with all existing features except $F_i$. The accuracy (e.g., f1-score) is measured for the surrogate model M' and the model without $F_i$. The decrease in f1-score is then interpreted by SMB 522 as the importance of the feature ($p_i$).

In yet another approach, SMB 522 may employ model-agnostic interpretable techniques (e.g., LIME) to assign a feature importance score $p_i$.

In another embodiment, interpretability module 502 may interact with the end user(s) via the UI(s) to identify new probable causes. More specifically, one problem with PFM 514 simply asking the end user to map understandable attributes is bootstrapping, which can be the result of the user not providing certain mappings or an incomplete set of mappings. To this end, SMB 522 may interactively engage the user via the UI to find out the most understandable attributes, and then provide an interpretable assessment of the model.

In one approach, interpretability module 502 may first present the important features of the original model to the user(s) via the UI(s). Note that this might include features used by the original model, which might be either non-understandable (e.g., some obscure combination of raw attributes) or not a probable cause of the phenomenon. The user will be provided an option to mark whether a certain feature, for this use case, is non-probable (for this specific use case). If the user chooses to mark the feature as non-probable (e.g., long-term mean jitter, etc.), then interpretability module 502 searches for the next nearest correlated variable. This can be done by using simple correlation, or by calling PFM 514 which maps the feature to the nearest other variable. In turn, SMB 522 will then create a surrogate model M' for the original model M, similar to the embodiment described previously. The user may further engage interpretability module 502 in an iterative manner until the user is satisfied with the interpretation of the model.

Such interactive user input is valuable in recognizing which attributes are probable causes, as well as others being user-suggested, nearest proxy understandable features. Such feedback about the acceptance or rejection of a variable, and the nearest variable selected, can be used by SMB 522 to update proxy feature mapping database 516, described above. For future use cases, SMB 522 may also query database 516 to recommend the most probable understandable variable to the user(s) via the UI(s). For example, assume that the user has marked the "long term mean jitter" attribute as a non-probable, and has accepted the "number of hops," as a preferred alternative. Then, "number of hops" can be given a higher weight in proxy feature mapping database 516, thus selecting this feature as a possible recommendation to explain "long term mean jitter" fields, rather than other attributes which might just have higher correlation.

As a result of its operation, SMB 522 may store the user-accepted surrogate model and the original model in model store 520.

In various embodiments, a further potential component of architecture 510 is causal model inference (CMI) engine 524, which is responsible for continuously providing a causal interpretation for every sample 526 used by the primary model to make an inference. In various embodiments, CMI engine 524 may be executed directly as part of interpretability module 502 or deployed for execution in conjunction with the inference engine that executes the inference model M (e.g., as part of machine learning module 304 in service 302, deployed on a networking element 306, etc.).

During execution, CMI engine 524 may take as input the rows of data presented to model M for inference. So far, the interpretation of model M was only provided to the UI(s) during the training process whereby metrics such as feature importance were computed for the entire training data. Here, CMI engine 524 also enables interpretation at model inference time (e.g., when model M makes a decision about a given sample 526).

In one embodiment, a suitable surrogate model M' is paired with an existing model M, using the information stored in model store 520. The important causal features for M' are also calculated, as described above, and the model pair (M, M') is used to evaluate their corresponding input features. The results of model M are used as the actual output for proposes of driving corrective actions in the network and alerting, thus not altering the accuracy of the existing model M in any way. In addition, this embodiment uses surrogate model M' to provide the most important feature for this instance that was a probable cause for the decision to the UI(s). This can be done as follows:

1. The sample 526 is evaluated with M' and its accuracy $a_i$ (e.g., probability of positive in a binary classification problem) is measured.
2. A feature attribution method, such as Shapley Additive exPlanations (SHAP) is then used, to determine the features with the largest attribute score for M'. Since this surrogate model only uses causal features, they can then be used as the probable cause for the decision/inference made by model M.
3. The top features, which have the largest attribution score, are then presented as the probable cause for the prediction to the end user via UI(s).

In another embodiment, the system may perform feature attribution for both models M and M', and then validate that they are consistent (i.e., that causal features that attributed for M' are indeed proxied by some important features for M).

Consequently, output data 528 may be sent to the UI(s) that include the output inference/decision of model M, as well as the most important interpretable features for that decision.

In some embodiments, architecture 510 may optionally also include model replacer 518, which is responsible for replacing a model M with an alternative interpretable model, as determined by SMB 522. Indeed, even in cases in which the surrogate model has lower accuracy than that of the non-interpretable model, the user may indicate via the UI that this is still acceptable. In such a case, model replacer 518 may then deploy the surrogate model to be used in lieu of the non-interpretable model for purposes of making inferences/decisions regarding the network. Note also that this can be only for certain use cases (e.g., for showing throughput anomalies), while other use cases may employ both models for their respective purposes (e.g., dynamic failure forecasting in tunnels and rerouting).

The use of model replacer 518 enables the dynamic creation of interpretable models by allowing user feedback and using proxy understandable features. In other words, the components described previously allow for: 1) the identification of proxy causal features, 2.) providing alternative interpretable surrogate models M' with user feedback where needed, and 3.) deciding the best interpretation. Model replacer 518 adds in an additional step to switch to using the interpretable surrogate model to assess the network, by eliciting the feedback from the data and with minimal user intervention.

In one embodiment, model replacer 518 may compare the accuracy and interpretability of the original model M and the user-accepted interpretable model M'. If the accuracy decrease is not significant, which may be evaluated as, say, accuracy(M')>=threshold-fraction*accuracy(M), then model replacer 518 may automatically replace M with its interpretable model M'. Model replacer 518 may also solicit user feedback via UI(s), too, by presenting the accuracy vs. interpretability tradeoff. The user may then choose to accept the alternative interpretable model M' or opt to use it only to interpret the decisions of model M.

Figure 6:
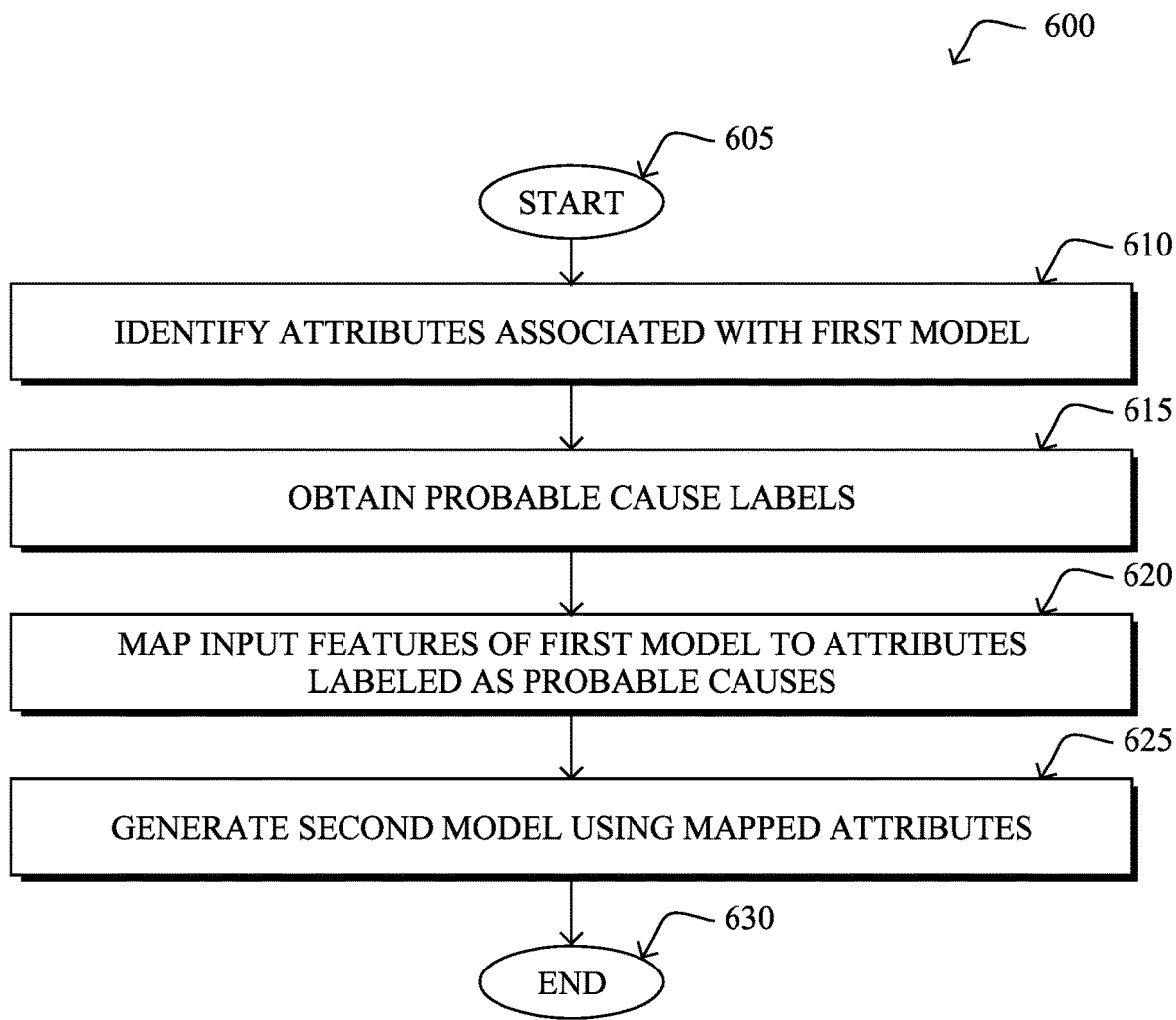
FIG. 6 illustrates an example simplified procedure for providing model interpretability using proxy features.

FIG. 6 illustrates an example simplified procedure 600 for providing model interpretability using proxy features, in accordance with one or more embodiments described herein. For example, a non-generic, specifically configured device may perform procedure 600 by executing stored instructions, to provide a service to a network. The procedure 600 may start at step 605, and continues to step 610, where, as described in greater detail above, the service may identify a set of attributes associated with a first machine learning model trained to make an inference about a computer network. In various embodiments, the inference may indicate an anomalous condition in the network or a predicted condition in the network (e.g., a predicted failure, a predicted load, etc.). In some embodiments, the set of attributes may have been used in an ETL pipeline to train the first machine learning model. However, some of the attributes may not have been used as an input feature of the first machine leaning model (e.g., due to other attributes being selected as input features, due to a data transformation of the attribute, the attribute being used to compute an input feature, etc.).

At step 615, as detailed above, the service may obtain labels for each of the set of attributes, each label indicating whether its corresponding attribute is a probable cause of the inference. In various embodiments, the service may do so by providing data regarding the set of attributes and the inference to one or more user interfaces and receiving, via the user interface(s), the labels for each of the set of attributes. For example, consider the case in which the first machine learning model makes a prediction that an SD-WAN tunnel is likely to fail within the next minute. In such a case, a user may flag each of the attributes (e.g., telemetry values used in the ETL pipeline for the model) as a probable cause of a tunnel failure or not.

At step 620, the service may map the input features of the first machine learning model to those attributes in the set of attributes that were labeled as probable causes of the inference, as described in greater detail above. In some embodiments, to do so, the service may calculate correlations between the attributes flagged as probable causes of the inference and other attributes in the set of attributes. For example, the service may, for each of the input features of the model, create proxy-mapping-sets that include correlation scores between the input features of the first model and those attributes flagged as probable causes of the inference.

At step 625, as detailed above, the service may generate a second machine learning model in part by using the mapped attributes to form a set of input feature for the second machine learning model, wherein the input features of the first model and the second model differ. Indeed, while the overall training goal for the first model may be its accuracy with respect to its inference, the training goal of the second model may be to use input features that are interpretable by an end user (e.g., the user will easily recognize a particular input feature as likely causing the inference). In some embodiments, the service may replace the first model with the second model, based on an evaluation of their respective accuracies (e.g., and potentially after seeking user feedback about the replacement). For example, it may be acceptable under certain circumstances to replace the first model with the second model, even though the second model exhibits lower accuracy, because the second model is more interpretable by a user. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for model interpretability using proxy features. In some aspects, in order aid in the interpretability of a first model, a second model may be trained using attributes mapped to the input features of the first model and are flagged as being probable causes of an inference of the first model (e.g., an anomalous behavior detected in the network, a predicted failure, etc.). In doing so, an end user, such as a network administrator, may better understand what factors may have helped to contribute to the inference, even if those factors were not actual inputs to the first model.

While there have been shown and described illustrative embodiments that provide for model interpretability using proxy features, it is to be understood that various other adaptations and modifications may be made within the spirit and scope of the embodiments herein. For example, while certain embodiments are described herein with respect to using certain models for purposes of detecting network anomalies and forecasting network conditions, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   identifying, by a service, a set of attributes associated with a first machine learning model trained to make an inference about a computer network;
   obtaining, by the service, labels for each of the set of attributes, wherein each label indicates whether its corresponding attribute is a probable cause of the inference;
   mapping, by the service, input features of the first machine learning model to those attributes in the set of attributes that were labeled as probable causes of the inference; and
   generating, by the service, a second machine learning model in part by using the mapped attributes to form a set of input features for the second machine learning model, wherein the input features of the first machine learning model and the input features of the second machine learning model differ.

2. The method as in claim 1, wherein the inference indicates an anomalous condition in the network or a predicted condition in the network.

3. The method as in claim 1, wherein the service obtains the labels for each of the set of attributes by:
   providing data regarding the set of attributes and the inference to one or more user interfaces; and
   receiving, via the one or more user interfaces, the labels for each of the set of attributes.

4. The method as in claim 1, wherein the set of attributes were used in an Extract-Transform-Load (ETL) pipeline to train the first machine learning model, and wherein the set of attributes includes at least one attribute not found in the input features of the first machine learning model.

5. The method as in claim 1, further comprising:
   using the first machine learning model to assess a telemetry sample from the network to make the inference about the network;

using the second machine learning model to assesses the telemetry sample from the network to identify a probable cause of the inference.

6. The method as in claim 5, wherein using the second machine learning model to assess the telemetry sample from the network to identify the probable cause of the inference comprises:
identifying the probable cause as one of the set of input features of the second machine learning model that most contributed to an output of the second machine learning model regarding the telemetry sample.

7. The method as in claim 5, further comprising:
providing data regarding the inference and the probable cause of the inference to a user interface.

8. The method as in claim 1, further comprising:
evaluating, by the service, an accuracy of the first machine learning model and an accuracy of the second machine learning model.

9. The method as in claim 8, further comprising:
replacing, by the service, the first machine learning model with the second machine learning model, based in part on the evaluation.

10. The method as in claim 1, further comprising:
deploying the second machine learning model to a network element in the network for execution.

11. The method as in claim 1, wherein mapping input features of the first machine learning model to those attributes in the set of attributes that were labeled as probable causes of the inference comprises:
calculating correlations between the attributes flagged as probable causes of the inference and other attributes in the set of attributes.

12. An apparatus, comprising:
one or more network interfaces;
a processor coupled to the network interfaces and configured to execute one or more processes; and
a memory configured to store a process executable by the processor, the process when executed configured to:
identify a set of attributes associated with a first machine learning model trained to make an inference about a computer network;
obtain labels for each of the set of attributes, wherein each label indicates whether its corresponding attribute is a probable cause of the inference;
map input features of the first machine learning model to those attributes in the set of attributes that were labeled as probable causes of the inference; and
generate a second machine learning model in part by using the mapped attributes to form a set of input features for the second machine learning model, wherein the input features of the first machine learning model and the input features of the second machine learning model differ.

13. The apparatus as in claim 12, wherein the inference indicates an anomalous condition in the network or a predicted condition in the network.

14. The apparatus as in claim 12, wherein the apparatus obtains the labels for each of the set of attributes by:
providing data regarding the set of attributes and the inference to one or more user interfaces; and
receiving, via the one or more user interfaces, the labels for each of the set of attributes.

15. The apparatus as in claim 12, wherein the process when executed is further configured to:
use the first machine learning model to assess a telemetry sample from the network to make the inference about the network;
use the second machine learning model to assesses the telemetry sample from the network to identify a probable cause of the inference.

16. The apparatus as in claim 12, wherein the process when executed is further configured to:
provide data regarding the inference and the probable cause of the inference to a user interface.

17. The apparatus as in claim 12, wherein the process when executed is further configured to:
evaluate an accuracy of the first machine learning model and an accuracy of the second machine learning model.

18. The apparatus as in claim 17, wherein the process when executed is further configured to:
replace the first machine learning model with the second machine learning model, based in part on the evaluation.

19. The apparatus as in claim 12, wherein the process when executed is further configured to:
deploy the second machine learning model to a network element in the network for execution.

20. A tangible, non-transitory, computer-readable medium storing program instructions that cause a service to execute a process comprising:
identifying, by a service, a set of attributes associated with a first machine learning model trained to make an inference about a computer network;
obtaining, by the service, labels for each of the set of attributes, wherein each label indicates whether its corresponding attribute is a probable cause of the inference;
mapping, by the service, input features of the first machine learning model to those attributes in the set of attributes that were labeled as probable causes of the inference; and
generating, by the service, a second machine learning model in part by using the mapped attributes to form a set of input features for the second machine learning model, wherein the input features of the first machine learning model and the input features of the second machine learning model differ.

* * * * *

UNITED STATES PATENT AND TRADEMARK OFFICE
CERTIFICATE OF CORRECTION

PATENT NO. : 11,507,887 B2
APPLICATION NO. : 16/832090
DATED : November 22, 2022
INVENTOR(S) : Vinay Kumar Kolar et al.

It is certified that error appears in the above-identified patent and that said Letters Patent is hereby corrected as shown below:

In the Specification

Column 15, Line 51, please amend as shown:
Optionally, the mapping set of each feature $A_i$ ($S(A_i)$) by Signed and Sealed this
Twenty-first Day of February, 2023

Katherine Kelly Vidal
*Director of the United States Patent and Trademark Office*